(12) United States Patent
You

(10) Patent No.: US 6,750,585 B2
(45) Date of Patent: Jun. 15, 2004

(54) BRUSH ASSEMBLY OF ALTERNATOR FOR VEHICLE HAVING IMPROVED BRUSH AND WIRING TO PREVENT LEAD WIRE INTERFERENCE DURING BRUSH EXTRACTION AND RETRACTION

(75) Inventor: Jae Pio You, Taegu (KR)

(73) Assignee: Korea Delphi Automotive Systems Corporation, Taegu (KR)

( * ) Notice: Subject to any disclaimer, the term of this patent is extended or adjusted under 35 U.S.C. 154(b) by 0 days.

(21) Appl. No.: 10/280,093

(22) Filed: Oct. 25, 2002

(65) Prior Publication Data

US 2004/0080231 A1 Apr. 29, 2004

(51) Int. Cl.[7] .............................................. H02K 13/00
(52) U.S. Cl. ...................... 310/239; 310/242; 310/248; 310/245
(58) Field of Search ................................ 310/239, 242, 310/68 R, 249

(56) References Cited

U.S. PATENT DOCUMENTS

| 2,631,252 A | * | 3/1953 | Falcettoni | 310/249 |
| 3,842,302 A | * | 10/1974 | Apostoleris | 310/239 |
| 4,404,487 A | * | 9/1983 | Nimura | 310/239 |
| 4,705,983 A | * | 11/1987 | Franz et al. | 310/68 D |
| 4,859,894 A | * | 8/1989 | Akutsu et al. | 310/239 |
| 5,481,150 A | * | 1/1996 | Tanaka et al. | 310/249 |
| 5,998,891 A | * | 12/1999 | Chen et al. | 310/68 R |
| 6,294,856 B1 | * | 9/2001 | Ishida et al. | 310/239 |

* cited by examiner

Primary Examiner—Nicholas Ponomarenko
Assistant Examiner—Yahveh Comas
(74) Attorney, Agent, or Firm—Jacobson Holman PLLC

(57) ABSTRACT

Disclosed is a brush assembly of an alternator for a vehicle including a brush holder including a hollow brush holder body, and wired brushes each received in the brush holder, and adapted to be urged against a slip ring fitted around a rotor shaft by a spring along an axis of the slip ring, thereby coming into elastic contact with the slip ring to obtain an electrical connection to an external electrical device, each of the wired brushes consisting of a brush, and a lead wire electrically connected to the brush. The brush holder body of the brush holder has brush channels each adapted to receive the brush of an associated one of the wired brushes, and wire channels each arranged at one side of an associated one of the brush channels while extending longitudinally in parallel to the associated brush channel and communicating with the associated brush channel. The brush of each wired brush is received at one end thereof in an associated one of the brush channels, and elastically supported by the spring associated with the wired brush while being electrically connected with the lead wire of the wired brush at the one end thereof.

3 Claims, 12 Drawing Sheets

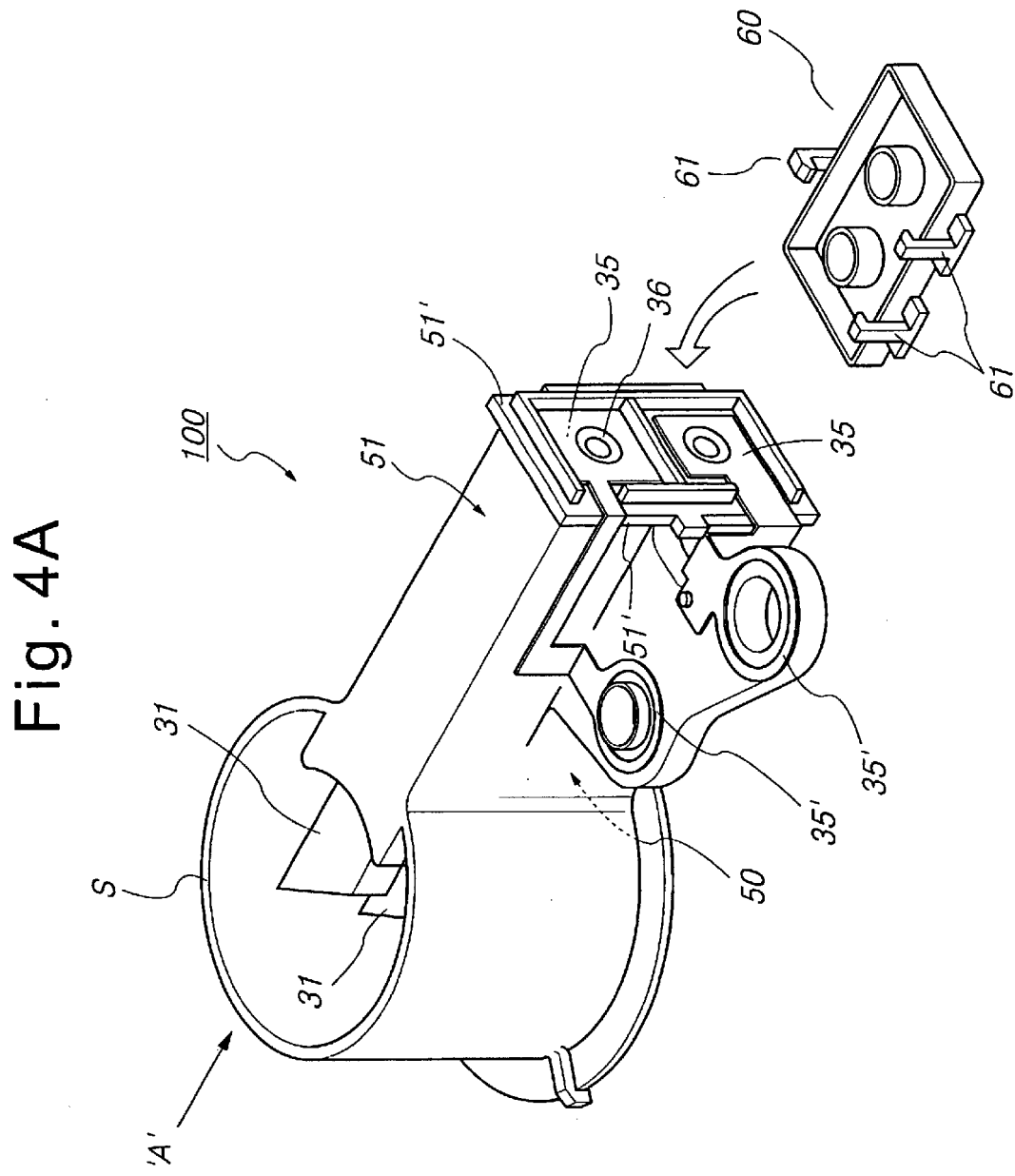

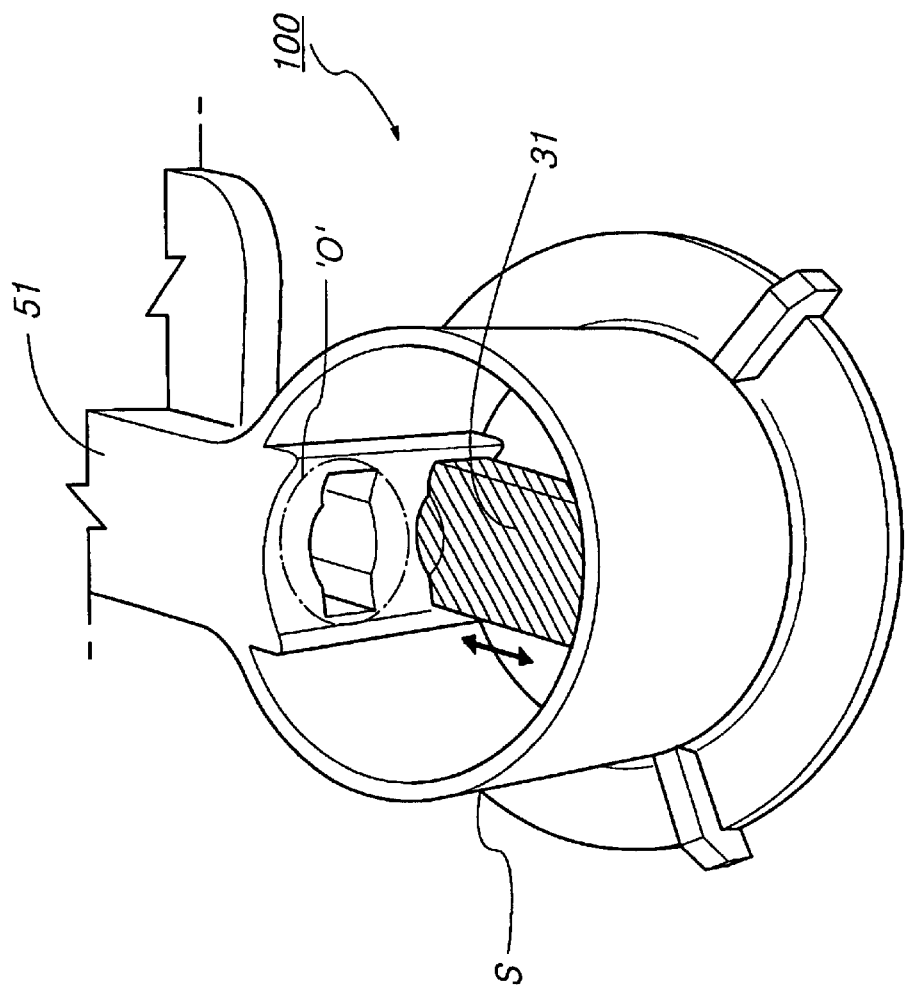

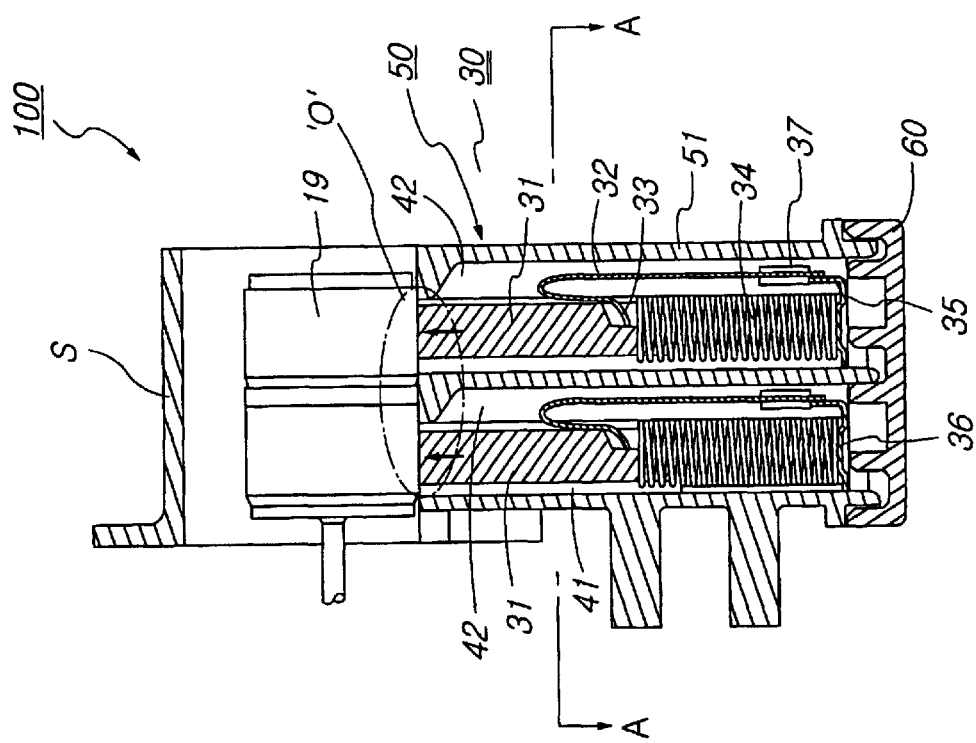

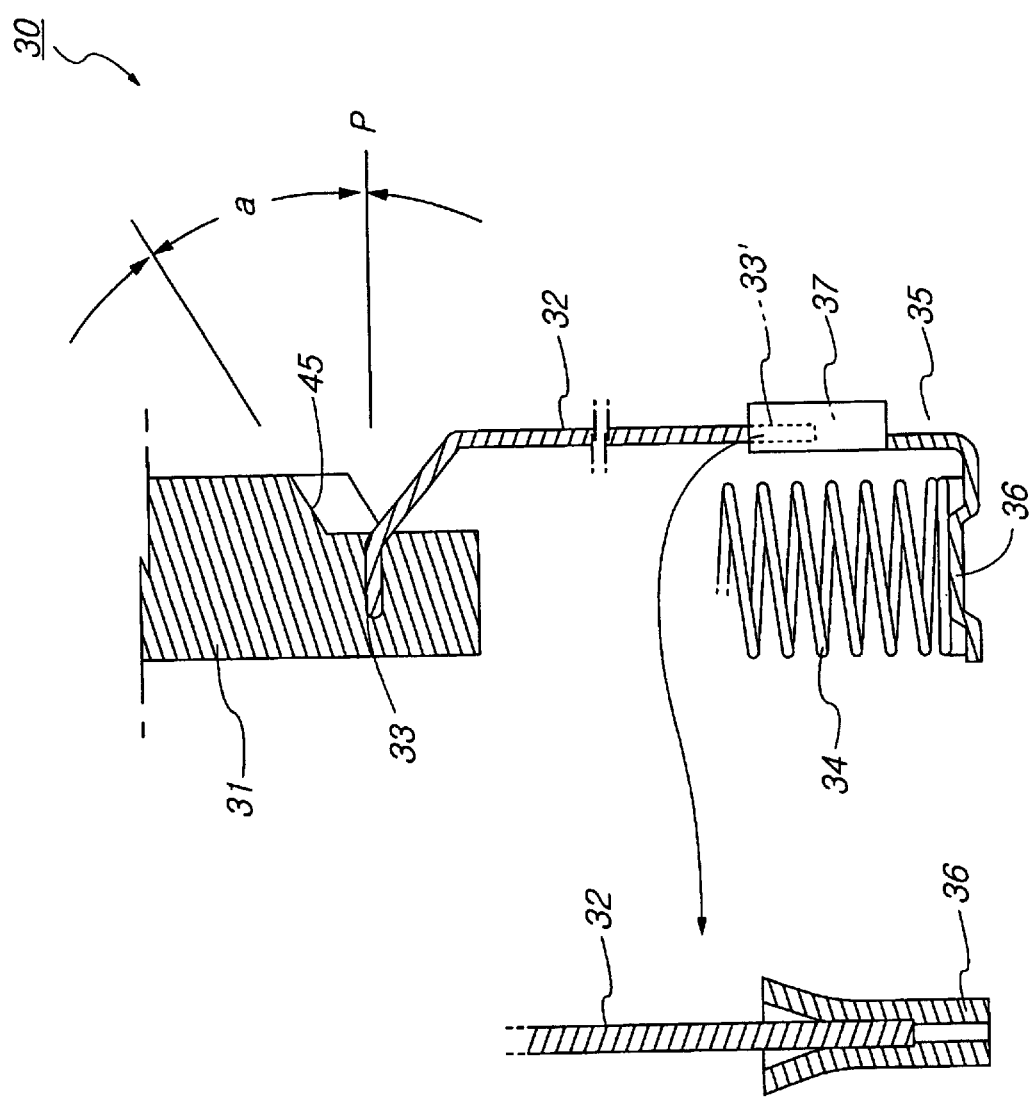

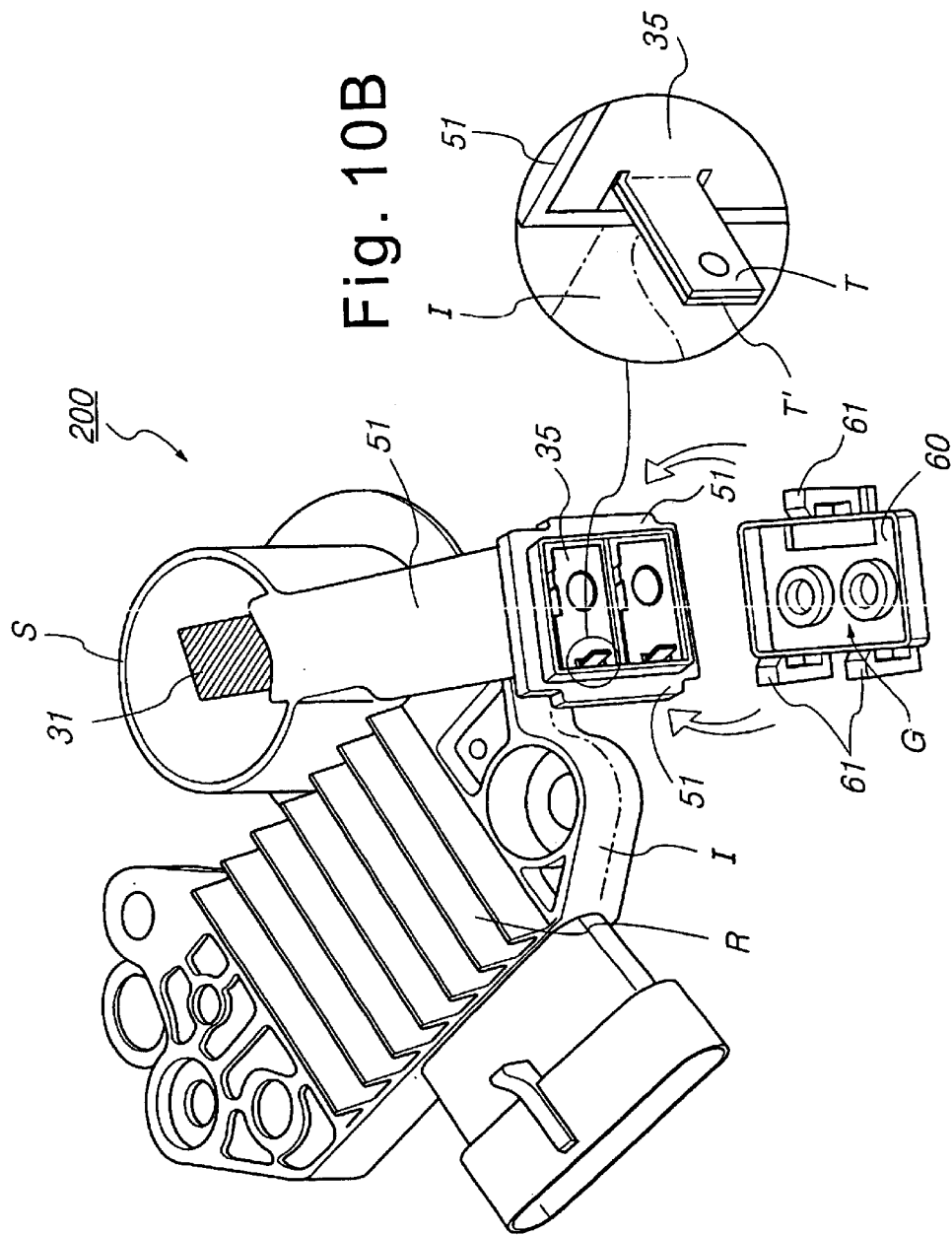

BRUSH ASSEMBLY OF ALTERNATOR FOR VEHICLE HAVING IMPROVED BRUSH AND WIRING TO PREVENT LEAD WIRE INTERFERENCE DURING BRUSH EXTRACTION AND RETRACTION

BACKGROUND OF THE INVENTION

1. Field of the Invention

The present invention relates to a brush assembly of an alternator for a vehicle, and more particularly to brush and holder assemblies having improved configurations in accordance with improvements in brushes serving as connecting means contacting a slip ring to supply magnetization current to a rotor coil, springs, lead wires, and terminals, and thus an improvement in reliability.

2. Description of the Related Art

In vehicles, an alternator is used as an important electrical device of an engine. Such an alternator is connected to an engine via a belt to generate electricity, thereby charging a battery while supplying, to other electrical devices, current required to operate those electrical devices. Alternators for vehicles mainly include a stator assembly interposed between a slip ring and a driver end frame, and a rotor assembly arranged inside the stator assembly, and supported by a rotor shaft.

The rotor shaft, which is included in the rotor assembly, is connected with a rotor coil at a rear end thereof. A slip ring is fitted in a rear end of the rotor shaft included in the rotor assembly. The slip ring is a terminal connected to the rotor coil while being mounted to the rotor shaft of the rotor assembly. A brush assembly comes into contact with the slip ling in order to supply magnetization current to the rotor coil.

Generally, the brush assembly has an integrated construction including a pair of brushes made of high-density carbon or carbon alloy, and received in a brush holder molded in accordance with an injection molding process. This brush assembly is assembled separately from other elements included in the alternator, and then fitted in the alternator.

Also, a regulator is assembled, as a separate integral element, in the alternator in order to maintain the voltage generated from the alternator to be at a desired level, so that it forms an electrical device.

The brush assembly includes wired brushes typically made of carbon received in a brush holder. The wired brushes are always urged against the slip ring on the rotor shaft by springs assembled in the brush assembly so that they perform a connection to the slip ring.

FIG. 1 is a sectional view illustrating a conventional alternator for vehicles. FIGS. 2A and 2B illustrate different states of wired brushes received in a brush assembly included in the alternator of FIG. 1, respectively. FIG. 3 illustrates the brush assembly.

As shown in FIG. 1, the conventional alternator, which is denoted by the reference numeral 10 in FIG. 1, includes a stator assembly 15 fitted in a space defined between a driver end frame 11 and a slip ring end frame 12. The stator assembly 15 consists of a stator core 13, and a stator coil 14. A rotor shaft 17 is freely rotatably mounted to the driver and slip ring end frames 11 and 12 by bearings 16 fitted in central portions of the driver and slip ring end frames 11 and 12. The rotor shaft 17 is provided at one end thereof with a pulley 17' for power transmission.

A spool bobbin 20 is fitted around a middle portion of the rotor shaft 17. A rotor coil 18 is wound around the spool bobbin 20 while being connected with a slip ring 19 arranged near the other end of the rotor shaft 17. Rotor cores 21 and 22 are coupled to the spool bobbin 20 around the spool bobbin 20. The rotor core 21 has a plurality of rotor poles 23, whereas the rotor core 22 has a plurality of rotor poles 24. Thus, a rotor assembly 25 is formed. A brush assembly is formed by wired brushes 1 arranged around the slip ring 19, and connected to the rotor coil 18 in order to supply current to the rotor coil 18. A regulator R is arranged at one side of the brush assembly.

As shown in FIGS. 2A and 2B, each of the wired brushes 1 is assembled separately from the remaining wired brushes 1, and then received in the brush assembly B. Each wired brush 1 includes a bar-shaped brush body made of a material such as high-density carbon or carbon alloy while having a rectangular cross-sectional shape, and a lead wire 3 fixed at one end thereof to the brush body 2 in accordance with a tamping process, and protruded from the brush body 2. The other end of the lead wire 3 is fixed to a terminal 4 receiving current, by means of a weld 5.

A spring 6 is fitted around the lead wire 3 in order to maintain the brush body 2 to be in contact with the slip ring 19. A sleeve 7 is coated over the lead wire 3 in order to prevent the lead wire 3 from being damaged by the spring 6.

Since the lead wire is fixed to the brush body by tamping, the above mentioned conventional configuration exhibits a low electrical conductivity, thereby causing a high voltage drop, and generation of heat. For this reason, the amount of supply current is reduced, thereby adversely affecting the performance of the alternator. Furthermore, since the sleeve should be coated around the lead wire, an increase in the manufacturing cost occurs. In addition, the wired brush has a degraded durability because the lead wire portion welded to the terminal is weak.

The conventional alternator involves a serious problem, for example, a jamming phenomenon, caused by its configuration during the procedure in which the brushes are extended and retracted. That is, the lead wire may be broken or mechanically caught by the spring as the lead wire arranged inside the spring is repeatedly bent or folded in accordance with the repeated extension and retraction of the brush. In severe cases, the brushes cannot be normally operated. That is, a so-called "jamming phenomenon" may occur. In addition, powder produced due to an abrasion of carbon brushes, dust, and other foreign matters may be introduced into slots where springs and lead wires of respective brushes are received. In this case, there is a high possibility that the lead wires, springs, and sleeves may adhere to one another due to such dust.

SUMMARY OF THE INVENTION

Therefore, an object of the invention is to provide a reliable brush assembly with a high quality improved over the related art.

In accordance with one aspect, the present invention provides a brush assembly of an alternator for a vehicle comprising a brush holder including a hollow brush holder body, and a pair of wired brushes each received in the brush holder, and adapted to be urged against a slip ring fitted around a rotor shaft by a spring along an axis of the slip ring, thereby coming into elastic contact with the slip ring to obtain an electrical connection to an external electrical device, each of the wired brushes consisting of a brush, and a lead wire electrically connected to the brush, wherein: the brush holder body of the brush holder has a pair of brush channels each adapted to receive the brush of an associated one of the wired brushes, and a pair of wire channels each arranged at one side of an associated one of the brush channels while extending longitudinally in parallel to the associated brush channel and communicating with the associated brush channel; and the brush of each wired brush is received at one end thereof in an associated one of the brush channels, and elastically supported by the spring associated with the wired brush while being electrically connected with the lead wire of the wired brush at the one end thereof.

In accordance with another aspect, the present invention provides a brush assembly of an alternator for a vehicle comprising a brush holder including a hollow brush holder body, and a pair of wired brushes each received in the brush holder, and adapted to be urged against a slip ring fitted around a rotor shaft by a spring along an axis of the slip ring, thereby coming into elastic contact with the slip ring to obtain an electrical connection to an external electrical device, each of the wired brushes consisting of a brush, and a lead wire electrically connected to the brush, wherein: the brush holder body of the brush holder has a pair of brush channels each adapted to receive the brush of an associated one of the wired brushes, and a pair of wire channels each arranged at one side of an associated one of the brush channels while extending longitudinally in parallel to the associated brush channel and communicating with the associated brush channel; and the brush of each wired brush is received at one end thereof in an associated one of the brush channels, and elastically supported by the spring associated with the wired brush while being electrically connected with one end of the lead wire of the wired brush at the one end thereof; and further comprising: terminals mounted to an end of the brush holder body disposed near the other ends of the lead wires in the wired brushes, and connected to respective other ends of the lead wires by welding, the terminals having connection taps, respectively; an insert terminal formed to be integral with a regulator included in the alternator while having a plate shape, the insert terminal extending inwardly into the brush holder body at the end of the brush holder body while having, an inner end thereof, terminal taps adapted to be coupled with the connection taps of the terminals by welding, respectively; and a brush holder cap adapted to cover the end of the brush holder body.

BRIEF DESCRIPTION OF THE DRAWINGS

The above objects, and other features and advantages of the present invention will become more apparent after a reading of the following detailed description when taken in conjunction with the drawings, in which:

FIGS. 2A and 2B are front views illustrating different states of wired brushes received in a brush assembly included in the alternator of FIG. 1, respectively, in which FIG. 2A illustrates a spring-mounted state, and FIG. 2B illustrates a spring-removed state;

FIG. 4A is a perspective view illustrating a brush assembly according to an embodiment of the present invention;

FIG. 4B is an enlarged perspective view corresponding to the portion 'A' in FIG. 4A, illustrating a slip ring part in a state in which an upper brush is removed;

FIG. 5 is a sectional view corresponding to FIG. 4B, illustrating the brush assembly according to the embodiment of the present invention;

FIG. 6 is a sectional view illustrating only a wired brush included in the brush assembly according to the embodiment of the present invention;

DESCRIPTION OF THE PREFERRED EMBODIMENTS

Now, preferred embodiments of the present invention for accomplishing the above described object of the present invention will be described with reference to the annexed drawings.

Figure 1:
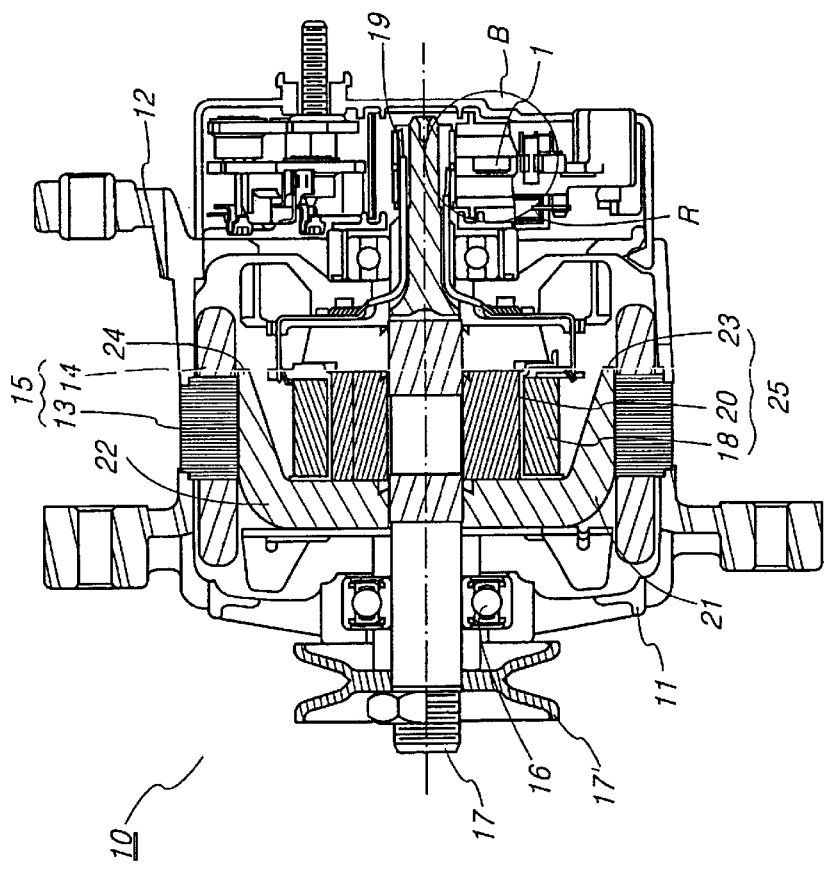
FIG. 1 is a sectional view illustrating a conventional alternator for vehicles.
Figure 2A:
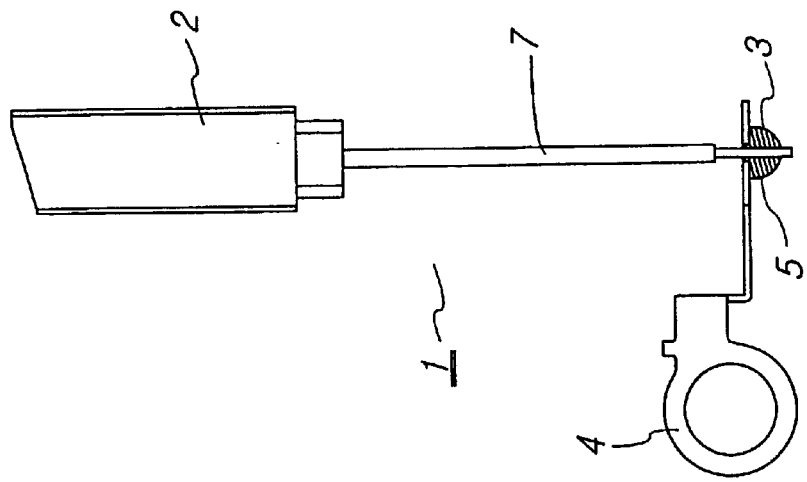
Figure 2B:
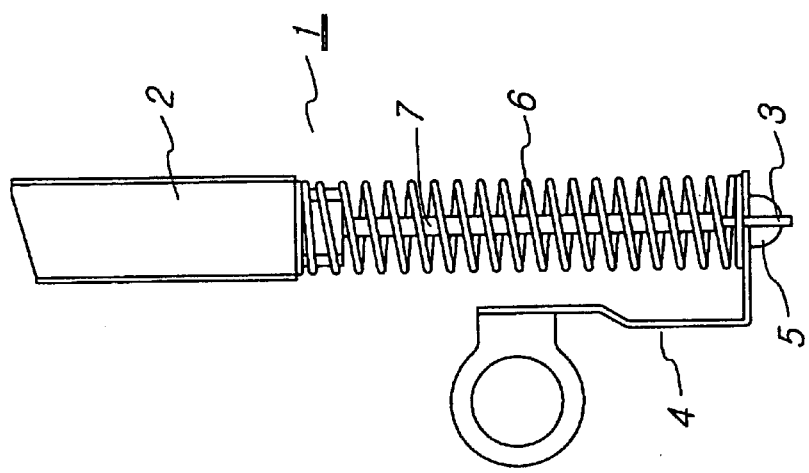
Figure 7:
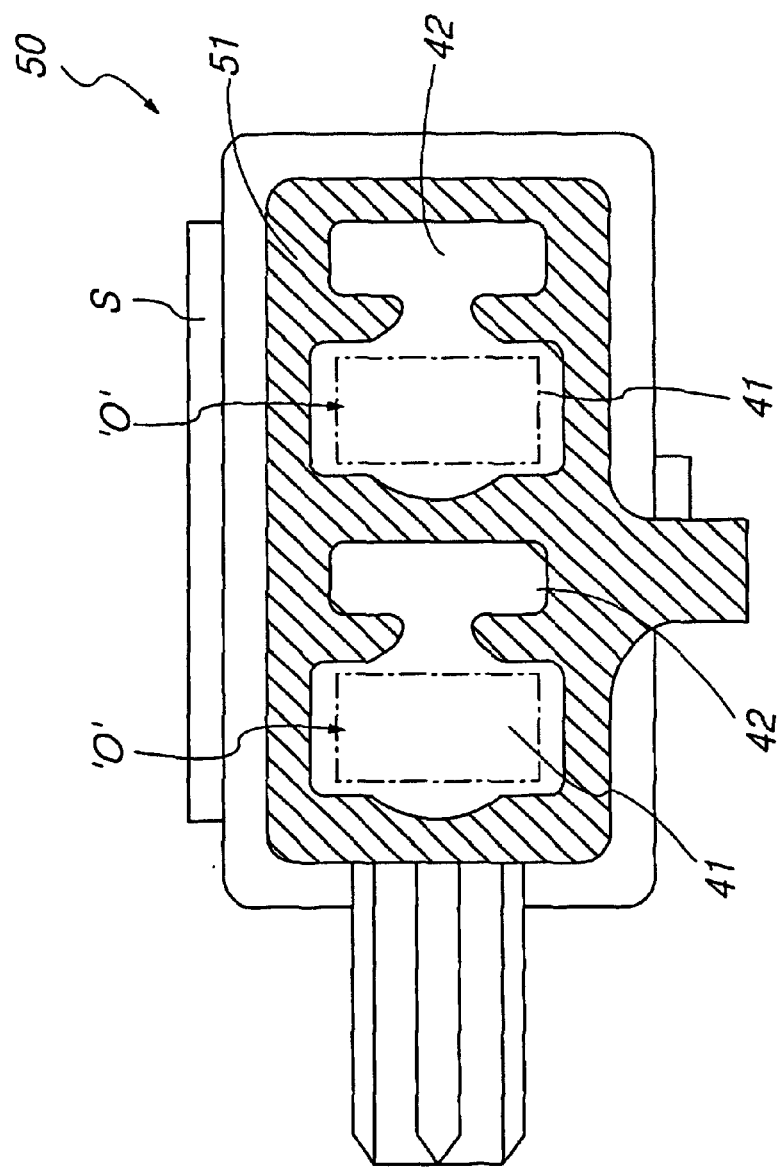
FIG. 7 is a cross-sectional view taken along the line A—A of FIG. 5.
Figure 8:
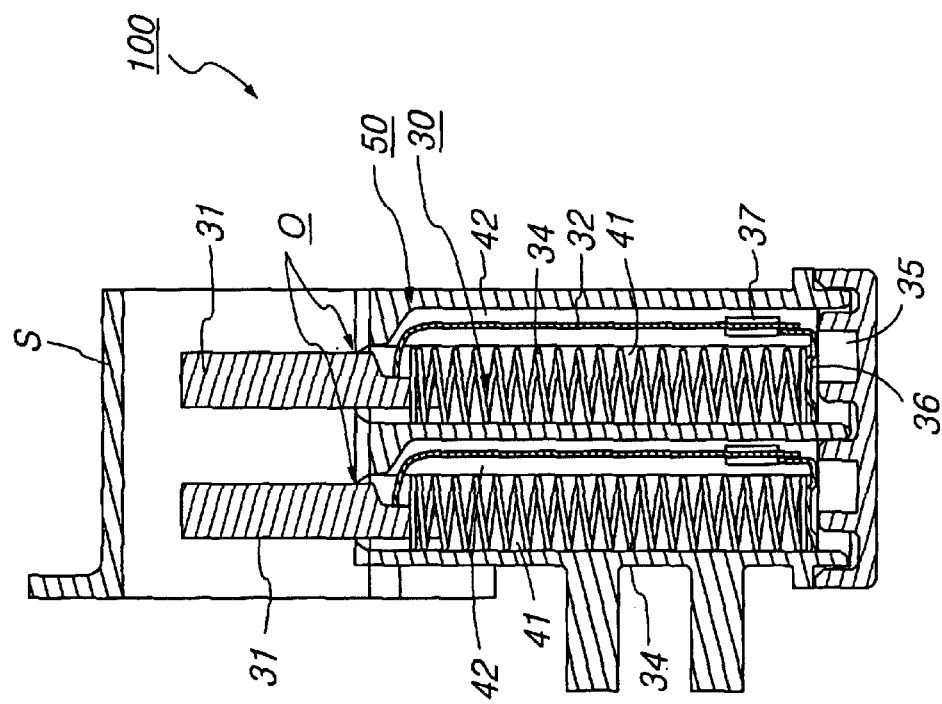
FIG. 8 is a sectional view illustrating the brush assembly according to the embodiment of the present invention in a state in which it is not fitted in a slip ring.
Figure 9:
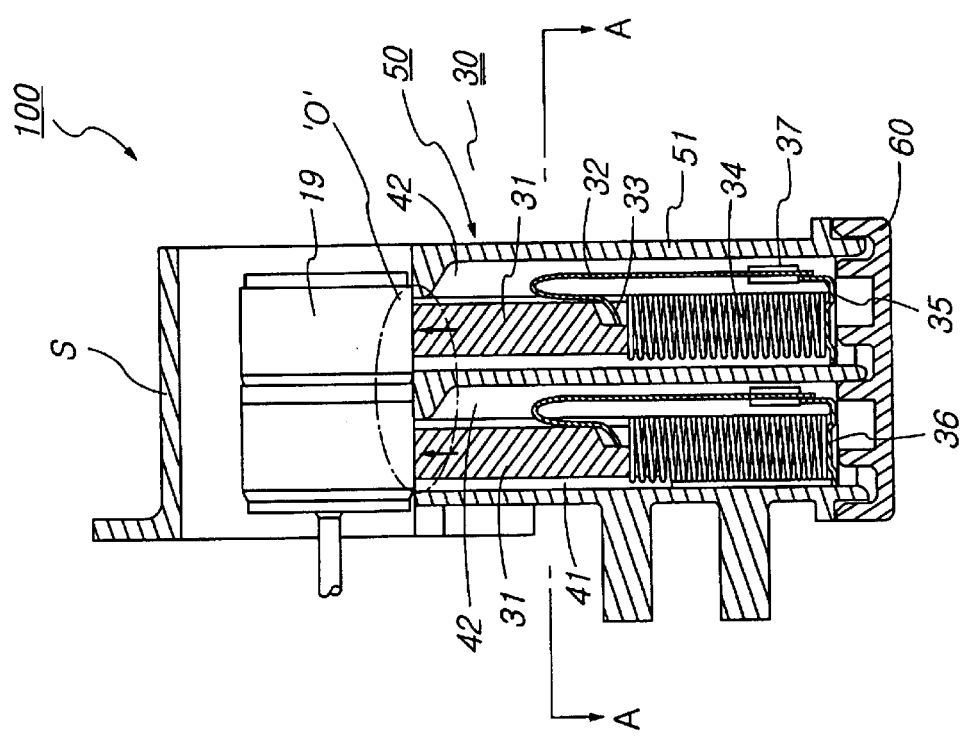
FIG. 9 is a sectional view illustrating the brush assembly in an assembled state in which it is fitted in the slip ring, that is, a spring-compressed state.

FIG. 1 illustrates the sectional configuration of a general alternator for vehicles in order to explain the present invention. FIG. 4A is a perspective view illustrating a brush assembly according to an embodiment of the present invention. FIG. 4B is an enlarged perspective view corresponding to the portion 'A' in FIG. 4A, illustrating a slip ring part in a state in which an upper brush is removed. FIG. 5 is a sectional view corresponding to FIG. 4B. FIG. 6 is a sectional view illustrating only a wired brush. FIG. 7 is a cross-sectional view taken along the line A—A of FIG. 5. FIG. 8 is a sectional view illustrating the brush assembly in a state in which it is not fitted in a slip ring. FIG. 9 is a sectional view illustrating the brush assembly in an assembled state in which it is fitted in the slip ring, that is, a spring-compressed state.

As shown in the drawings, the brush assembly of the present invention, which is denoted by the reference numeral 100, includes a brush holder 50 molded to have an integrated structure in accordance with an injection molding process, and a slip ring guide S arranged at one side, that is, front side, of the brush holder 50 while having a substantially ring shape to receive a slip ring 19. Of course, the slip ring guide S is not the essential element of the brush holder 50.

The brush holder So includes a brush holder body 51 formed to be integral with the slip ring guide S while having an elongated tube shape extending substantially perpendicularly to the axis of a shaft 17 included in an alternator to which the brush assembly 100 is applied. The brush holder body 51 receives a pair of brushes 31 therein.

As shown in the sectional view of FIG. 7, the brush holder body 51 has brush channels 41 adapted to receive respective brushes 31, and wire channels 42 each arranged at one side of an associated one of the brush channels while extending longitudinally in parallel to the associated brush channel 41 and communicating with the associated brush channel 41. Each wire channel 42 has a cross section smaller than that of the associated brush channel 41. Each brush channel 41 is arranged beneath the associated wire channel 42.

Each brush 31, which is received in an associated brush channel 41, is made of carbon or carbon alloy. Lead wires 32 extend through respective wire channels 42. Each lead wire 32 is fixed, at its one end 33, to a rear end of the brush 31 received in the brush channel 41 communicating with the wire channel 42 through which the lead wire 32 extends. The fixing of the lead wire 32 is achieved in accordance with a molding process.

Preferably, the brush holder body 51 is provided with brush holes O at front end portions thereof facing the slip ring 19 and corresponding to the brush channels 41, respectively. Each brush hole O is opened to an associated one of the brush channels 41 while being closed with respect to the wire channels 42, in order to allow only the brush 31 received in the associated brush channel 41 to be extended and retracted through the brush hole O while being in close contact with the brush hole O.

Figure 3:
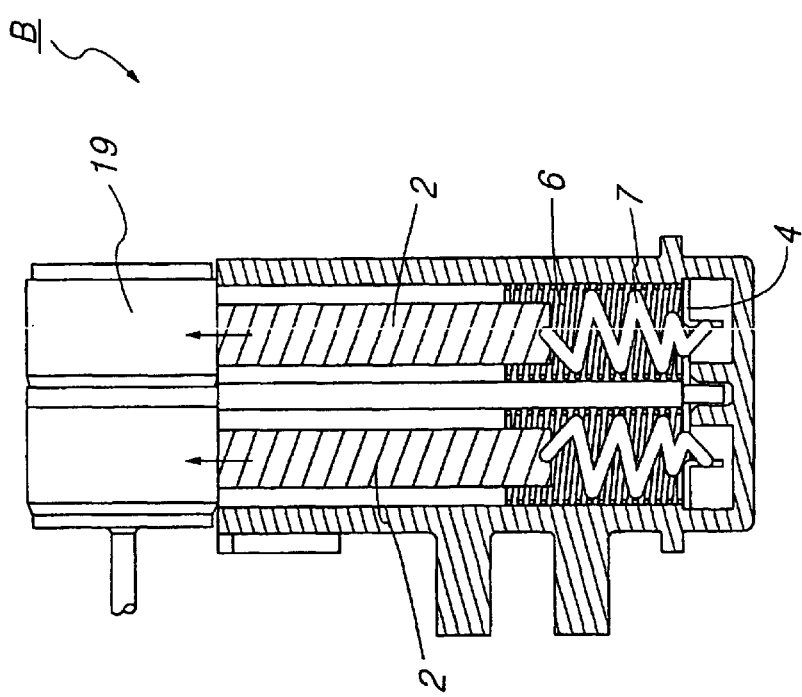
FIG. 3 is a sectional view illustrating the state in which conventional wired brushes are fitted in a slip ring.

In the conventional case of FIG. 3, there is a problem in that it is impossible to reliably prevent carbon powder, rainwater, and foreign matters from being introduced into the interior of the brush holder body because the insertion of brushes is carried out from the slip ring. However, the brush holes O according to the present invention eliminates such a problem involved with the conventional case.

The other end 33' of each lead wire 32 connected at one end thereof with the associated brush 31 is coupled to a terminal 35. A spring 34 is fitted, at one end thereof, around the rear end of each brush 31. The other end of the spring 34 is supported by the associated terminal 35. In order to stably support each spring 34, the associated terminal 35 is formed with an embossment 36. Each terminal 35 also has, at one end thereof, a connector 37 for connecting an associated one of the lead wires 32 to the terminal 35. As shown in FIG. 4A, each terminal 35 has a connection end 35' externally exposed and adapted to be connected to the terminal of a regulator by screws.

The connector 37 is assembled by bending a metal plate to surround the end 33' of the associated lead wire 32, and welding the bent metal plate to the associated terminal 35. Thus, each lead wire 32 is coupled, at one side of the associated spring 34, to the associated brush 31 and the connector 37 of the associated terminal 35 while being received in the associated wire channel 42 formed in addition to the associated brush channel 41 in the brush holder 50.

Accordingly, each connector 37 is disposed within the associated wire channel 42 while limiting the movement path of the lead wire 32 within the associated wire channel 42. Accordingly, it is possible to completely prevent the lead wire 32 from interfering with the associated spring 34.

Each brush 31 is provided at its rear end with an upwardly-inclined surface 45 having a desired inclination angle a with respect to the fixing point P of the lead wire end 33 to the brush 31. By virtue of this inclined surface 45, it is possible to prevent the lead wire 32 from interfering with the associated brush 31 during the extension and retraction operations of the brush 31. In the wired brush 30 according to the present invention, each brush 31 is coupled with the associated lead wire 32, using a molding process.

In accordance with the above described configuration, the wired brush exhibits a superior electrical conductivity, a low is voltage drop, and a reduced heat generation. Accordingly, the amount of exciting current is increased, thereby contributing to an improvement in the output power of the alternator. Moreover, the spring 34 does not interfere with the associated lead wire during the compression and expansion operations thereof carried out in accordance with the retraction and extension of the associated brush 31. Also, the dust produced due to the abrasion of the brush 31 caused by its contact with the slip ring 19 does not enter the wire channel 42. As a result, there is no jamming phenomenon. In addition, since it is unnecessary to use sleeves used to protect lead wires in conventional cases, it is possible to reduce the manufacturing cost.

The ends of the brush channels 41 and wire channels 42 opposite to the slip ring 19 define an open space for receiving desired elements of the alternator. The open space is closed by a brush holder cap 60 having a plug shape. The brush holder cap 60 has a plurality of engagement jaws 51' adapted to be engaged with-engagement steps 51' formed at the end of the brush holder 51 opposite to the slip ring 19. Accordingly, the brush holder cap 60 can be detachably attached to the end of the brush holder 51.

FIG. 8 is a sectional view illustrating the non-insertion state of the brush assembly 100 at which the brushes 31 are in a state of being extended in accordance with the free expansion is of the springs. FIG. 9 is a sectional view illustrating the state in which the brush assembly 100 is fitted in the slip ring 19, thereby causing the brushes 31 to be retracted while compressing the springs.

In the brush assembly 100 having the above described configuration, spaces respectively receiving the brush 31 and lead wire 32 associated with each other while allowing those brush 31 and lead wire 32 to operate therein are separated from each other. In accordance with this arrangement, it is possible to completely prevent an interference between the brush 31 and lead wire 32 associated with each other. Accordingly, it is possible to avoid abrasion of the brush 31 caused by the interference, and abnormal operations caused by carbon power produced by the abrasion.

It is also possible to minimize the interference between the associated brush 31 and lead wire 32 during the extension and retraction operation of the lead wire 32, thereby preventing the lead wire 32 from being broken.

Since each brush hole O formed at the front end of the brush holder 50 is configured to allow the associated brush 31 to be extended and retracted therethrough while being in close contact therewith, it is possible to minimize the introduction of carbon powder, produced due to an abrasion of the brush 31 and slip ring 19, into the wire channel 42. In particular, since the assembling procedure of the brush assembly 100 is carried out at the rear end of the brush holder 50, the efficiency of the assembling procedure is enhanced.

Figure 10:
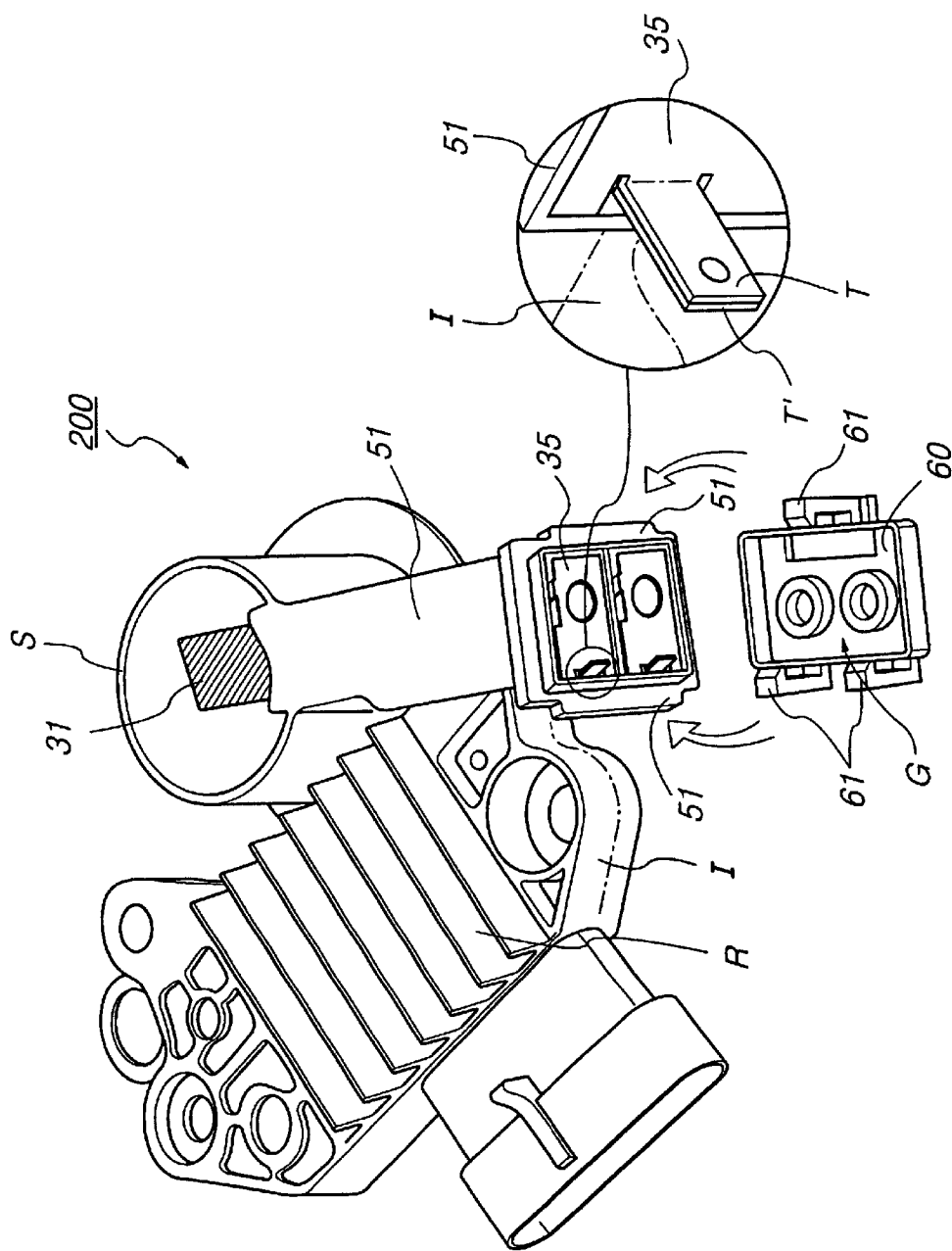
FIG. 10 is a perspective view illustrating a brush assembly according to another embodiment of the present invention.

Referring to FIG. 10, a brush assembly according to another embodiment of the present invention is illustrated.

In the above described embodiment, the connection end 35' of each terminal 35 contacting the other end of the associated spring 34 is connected to the terminal of the regulator in an externally exposed state. For this reason, the exposed connection end 35' may be corroded under severe circumstances or conditions.

In order to solve such a problem, the brush assembly 200 is configured to be integral with a desired electronic device included in the alternator, for example, the regulator R, in accordance with the embodiment shown in FIG. 10. In this case, an insert terminal I is molded to be integral with the regulator R in accordance with an insert molding process. The insert terminal I extends inwardly into the interior of the brush holder body 51 at the rear end of the brush holder body 51, and has terminal taps T' at its inner end. In accordance with this embodiment, the terminals 35 also have connection taps T, respectively. The connection taps T and terminal taps T' may be designed to contact each other, and to be fixed to each other by welding.

Under the condition in which each connection tap T is connected with the insert terminal I of the regulator R by welding, the brush holder cap 60 is mounted to the brush holder body 51 by engaging the engagement hooks 61 with the engagement steps 51'. In accordance with this embodiment, all connecting elements are received in the inner space G of the brush holder cap 60. Accordingly, it is possible to minimize the introduction of foreign matters into the brush holder while obtaining an increased durability against external factors such as vibrations.

As apparent from the above description, the present invention provides a brush assembly of an alternator for vehicles which achieves an improvement in wired brushes to obtain a stable durability and a reliability in operation, thereby achieving an improvement in the performance of the alternator, a stable product quality, and a reduction in the manufacturing cost.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A brush assembly having improved wiring of an alternator for a vehicle, comprising a brush holder including a hollow brush holder body and a pair of wired brushes received in said brush holder body and adapted to be urged against a slip ring fitted around a rotor shaft by a spring along an axis of said slip ring, thereby coming into elastic contact with the slip ring to obtain an electrical connection to an external electrical device, each of the wired brushes including a brush and a lead wire electrically connected thereto, said brush holder body having a pair of brush channels each adapted to receive a respective one of said wired brushes, and a pair of wire channels each arranged at one side of an associated one of said brush channels and extending longitudinally in parallel therewith and communicating with said associated brush channel, the brush of each wired brush being received at a first end thereof in an associated one of said brush channels and elastically supported by the spring associated with the respective wired brush while being electrically connected at a fixing point with one end of the associated lead wire of the respective wired brush at said first end, each of said brushes being provided at said first end with an inclined surface having a desired inclination angle with respect to said fixing point, said fixing point being between the brush supporting end of said associated spring and said inclined surface, said inclined surface serving to prevent said associated lead wire from interfering with the respective brush during extension and retraction operations thereof.

2. The brush assembly as set forth in claim 1, further comprising:

terminals mounted to an end of the brush holder body disposed near the other ends of the lead wires in the wired brushes-and connected to respective other ends of the lead wires by welding, the terminals having respective connection taps;

terminals having an embossment adapted to support the spring associated with a respective one of the wired brushes;

an insert terminal formed to be integral with a regulator included in the alternator, the insert terminal extending inwardly into the brush holder body while having, at an inner end thereof, terminal taps adapted to be coupled with the connection taps of said terminals, respectively.

3. The brush assembly as set forth in claim 2, further comprising a brush holder cap adapted to cover the end of the brush holder body.

* * * * *